(12) United States Patent
Keagy

(10) Patent No.: US 7,369,530 B2
(45) Date of Patent: May 6, 2008

(54) APPARATUS AND METHOD FOR INTERFACING PACKET-BASED PHONE SERVICES WITH EMERGENCY CALL CENTERS

(76) Inventor: Scott Keagy, 1926 Cape Hilda Pl., San Jose, CA (US) 95133

( * ) Notice: Subject to any disclaimer, the term of this patent is extended or adjusted under 35 U.S.C. 154(b) by 999 days.

(21) Appl. No.: 10/769,035

(22) Filed: Jan. 30, 2004

(65) Prior Publication Data
US 2005/0174991 A1    Aug. 11, 2005

(51) Int. Cl.
*H04Q 7/28* (2006.01)
(52) U.S. Cl. ................................................ 370/340
(58) Field of Classification Search ................ 370/340
See application file for complete search history.

(56) References Cited

U.S. PATENT DOCUMENTS 6,061,566 A * 5/2000 Friman ........................ 455/445
6,710,702 B1 * 3/2004 Averbuch et al. ............ 340/7.1
6,778,528 B1 * 8/2004 Blair et al. .................. 370/352
7,289,493 B1 * 10/2007 Vera ............................ 370/356

OTHER PUBLICATIONS

"NENA Technical Information Document on the Network Interface to IP Capable PSAP," Feb. 2003, NENA, USA.
"J-STD-036: Enhanced Wireless 9-1-1 Phase II," Jun. 2000, Telecommunications Industry Association, located at http://www.tiaonline.org/standards/search_results2.cfm?document_no=J-STD-036.

* cited by examiner

*Primary Examiner*—Creighton Smith

(57) ABSTRACT

A gateway is provided for interfacing packet-based phone services with controllers of emergency call centers. For each type of electronic medium to be interfaced, the gateway comprises a specific I/O interface and a specific module such as a protocol stack. The gateway also comprises an auxiliary information gateway application that integrates the I/O interfaces and modules into a logical framework that enables inter-working therebetween. A controller that includes the functionality of the gateway device is also provided. Methods for enabling emergency calls, and more generally for enabling a multi-media session, are also provided.

16 Claims, 7 Drawing Sheets

APPARATUS AND METHOD FOR INTERFACING PACKET-BASED PHONE SERVICES WITH EMERGENCY CALL CENTERS

BACKGROUND OF THE INVENTION

1. Field of the Invention

The present invention relates generally to the field of electronic communications, more particularly to inter-working electronic media that operate under disparate protocols, and most particularly to improving access to emergency call centers from phone services that employ networks, such as the Internet, for packet-based data transmission.

2. Description of the Prior Art

In many parts of the world, a three-digit emergency telephone number, such as 911 in the United States and Canada, can be dialed to access emergency services from any telephone connected to a Public Switched Telephone Network (PSTN). FIG. 1 illustrates a common system arrangement for a Public Safety Answering Point (PSAP) 100 for receiving emergency calls and dispatching emergency services. The PSAP 100 includes a controller 102 and a terminal 104. The controller 102, which is a phone system much like a standard Private Branch Exchange (PBX) system, is connected to both a network of selective routers 106 that direct in-coming calls to the PSAP 100, and to a database 108 that stores information associated with telephone numbers.

In operation, when a caller dials an emergency telephone number, the call is routed to the network of selective routers 106 that determines the appropriate PSAP 100 for the call. In some instances, the call may be routed between several selective routers 106 in the network before being connected to the appropriate PSAP 100. Such further routing can occur, for example, when the first selective router 106 is too busy to handle the call. The call is then routed to the controller 102 of the PSAP 100 over a voice trunk according to a telephony protocol such as Centralized Automatic Message Accounting (CAMA) or Basic Rate Interface (BRI). The controller 102 then directs the call to an available terminal 104 to be answered by a call taker.

It should be noted that each time a phone number is transmitted from one selective router 106 to another, or from a selective router 106 to the controller 102, each digit is sent in series and each digit can take upwards of 100 milliseconds in the case of a voice trunk using a CAMA protocol. Accordingly, the caller may experience a delay on the order of 15 seconds before being connected to the PSAP 100. This delay is usually accompanied by complete silence on the line, and accordingly, callers sometimes abandon their calls believing that the system is not functioning.

The controller 102 is also connected to a database 108, typically by a serial interface such as an RS-232 type of link. The database 108, which can be a location database such as an Automatic Location Identification (ALI) database, associates telephone numbers with information, such as street addresses and jurisdictional districts for police, medical, and fire response authorities. Upon receiving a call, the controller 102 queries the database 108 for any records associated with the phone number from which the call is being made. The controller 102 then forwards the records to the terminal 104 where the records are displayed to the call taker. Querying the database 108 and transmitting the record to the terminal 104 can also incur a delay of 10 to 15 seconds.

The database 108 is based on an assumption that phone numbers are associated with telephones at fixed locations. Recently, the emergence of mobile phone systems has complicated the process of directing emergency calls to the correct PSAP 100 and providing accurate records to call takers. For mobile phones, triangulation from multiple cell phone towers can often provide at least location information necessary to direct an emergency call to the correct PSAP 100. However, phone services through networks, such as the Internet, that employ packet-based data transmission present a further dilemma. A user of such a phone system may be anywhere in the world where a network connection is available. Accordingly, few network phone service providers offer an emergency telephone number service.

FIG. 1 further illustrates how some network phone service providers presently offer an emergency telephone number service. When a user dials the emergency telephone number the service provider recognizes the emergency telephone number and accesses a look-up table that correlates the user's phone number with a phone number for an administrative line into a PSAP 100. The call is then directed across a packet-based network 120 to that administrative phone number through a gateway 122 to a PSTN 124. The gateway 122 provides a conversion from a packet-based network protocol to an analog telephony protocol appropriate for the PSTN 124. The PSTN 124 then directs the call to a phone system 126 associated with the phone number of the administrative line. The phone system 126 can be, for example, a PBX system. The phone system 126 rings a phone 128 in the PSAP 100. In this way the user is connected to a phone 128 at the PSAP 100. Unfortunately, since the phone 128 is outside of the established system for receiving emergency calls, there is no assurance that the call will be answered, or if answered, will be answered by a trained emergency call taker or appropriately prioritized. Also, no facility exists to query the database 108 since the call did not come through the controller 102, and generally a callback number cannot be displayed.

Therefore, what is needed is a way to route emergency calls made through phone services that employ packet-based data transmission networks to the existing infrastructure of emergency call centers.

SUMMARY

A gateway device for a PSAP comprises a packet I/O interface for communicating with a packet-based network and a telephony I/O interface for communicating with a controller of the PSAP. The gateway device also comprises packet protocol stacks for handling data packets, a TDM/Telephony signaling module for generating telephone signaling information and handling analog or digital voice data, and an auxiliary information gateway application. The auxiliary information gateway application is configured to use the packet protocol stacks and the TDM/Telephony signaling module to parse call session set-up information from a request packet and generate telephone signaling information therefrom. Further, the auxiliary information gateway application is configured to convert analog or digital voice data to packetized voice data and direct the packetized voice data to the packet I/O interface, and convert packetized voice data to analog or digital voice data and direct the analog or digital voice data to the telephony I/O interface. Accordingly, the gateway device allows a call session to be set up and for a voice data channel to be established between a calling party using a telephone that sends and receives voice data in a packet-based protocol and the controller that sends and receives voice data using a telephony protocol. In some of these embodiments, the auxiliary information gateway application is further configured to use the packet protocol stacks to convert packetized data between packet-based protocols.

In some embodiments, the gateway device further comprises database protocol stacks, and the auxiliary information gateway application is further configured to use the packet protocol stacks and the database protocol stacks to parse location information from the request packet and provide the location information as a location database record to a database I/O interface. In other embodiments, the gateway device further comprises a database I/O interface for communicating with a location database and database protocol stacks for handling location database records. In some of these embodiments, the auxiliary information gateway application is further configured to parse a telephone number from the call session set-up information and send the telephone number to the database I/O interface. Also in some embodiments, the auxiliary information gateway application is further configured to receive a location database record from the database I/O interface, use the packet protocol stacks and the database protocol stacks to packetize the location database record, and direct the packetized location database record to the packet I/O interface.

A controller for a PSAP is also provided that comprises the functionality of the gateway device. The controller comprises a packet I/O interface for communicating with a packet-based network, a telephony I/O interface for communicating with a PSTN, packet protocol stacks for handling data packets, a TDM/Telephony signaling module for generating telephone signaling information and handling analog or digital voice data, and an auxiliary information gateway application. The auxiliary information gateway application is configured to use the packet protocol stacks and the TDM/Telephony signaling module to parse call session set-up information from a request packet and generate telephone signaling information therefrom, convert analog or digital voice data to packetized voice data, direct the packetized voice data to the packet I/O interface, convert packetized voice data to analog or digital voice data, and direct the analog or digital voice data to the telephony I/O interface.

A method for enabling an emergency call comprises receiving a request packet from a calling party, parsing call session set-up information from the request packet, and generating telephone signaling information, including a telephone number of the calling party, from the call session set-up information. The method further comprises sending the telephone signaling information to a controller, establishing a voice data channel through the controller, querying a database using the telephone number, and providing a database record to the controller. In some embodiments, the method can further comprise parsing auxiliary information from the request packet, and in some of these embodiments the method can further comprise buffering the auxiliary information. Also in some embodiments, the method can further comprise sending the auxiliary information to the controller, and in some of these embodiments the method can further comprise converting the auxiliary information from a packet-based protocol into another protocol. In some embodiments, the auxiliary information comprises location information.

Another method for enabling an emergency call comprises receiving telephone signaling information from a calling party, parsing a telephone number from the telephone signaling information, and generating a request packet comprising call session set-up information including the telephone number. The method further comprises sending the request packet to a controller, establishing a voice data channel through the controller, querying a database using the telephone number, and providing a database record to the controller. In some embodiments, providing the database record to the controller comprises packetizing the database record. Also in some embodiments, providing the database record to the controller comprises periodically querying the database for an updated record.

Yet another method of the invention is directed to enabling a multi-media session. This method comprises receiving data from a first endpoint formatted according to a first protocol and including a first correlating identifier, receiving data from a second endpoint formatted according to a second protocol and including a second correlating identifier, and providing data to a third endpoint, the data formatted according to a third protocol and comprising data from the first and second endpoints correlated according to the first and second correlating identifiers. In some embodiments, the method further comprises requesting the data from the second endpoint by sending the first correlating identifier to the second endpoint. In some embodiments, receiving data from the first endpoint formatted according to the first protocol and including the first correlating identifier comprises receiving voice data from a calling party formatted according to a telephony protocol and including a telephone number. In some of these embodiments, receiving data from the second endpoint formatted according to the second protocol and including the second correlating identifier comprises receiving a database record from a database formatted according to a database protocol and including the telephone number. In some of the latter embodiments, providing data to the third endpoint comprises providing packetized data to a controller of a PSAP, and the third protocol is a packet-based protocol.

DETAILED DESCRIPTION OF THE INVENTION

Phone services that employ networks for packet-based data transmission are becoming increasingly popular. Such services are commonly referred to as IP telephony, Voice over the Internet (VOI), or Voice over IP (VoIP). Networks that support such services will be referred to herein generally as packet-based networks, and the service providers will be referred to herein generally as packet-based service providers.

Figure 1:
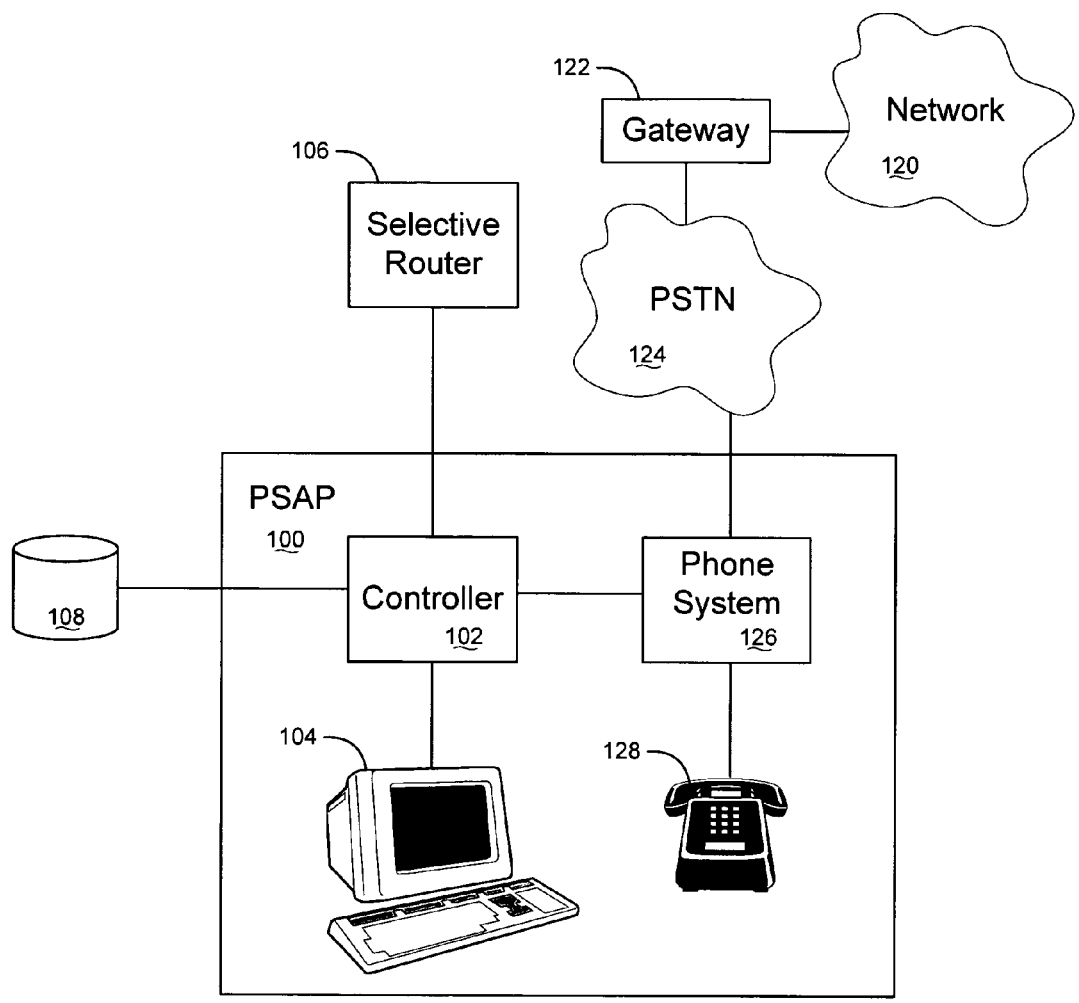
FIG. 1 is a schematic representation of a Public Safety Answering Point (PSAP) according to the prior art.

The invention is directed to methods and apparatus for the inter-working of electronic media operating under disparate protocols. Multiple embodiments of the present invention are particularly directed to the context of systems for receiving emergency calls. For example, in many locations PSAPs and the telephone systems to which they are connected (FIG. 1) principally operate under telephony protocols for handling analog or digital voice data. The present invention allows newer technologies, such as VoIP, that operate under completely different protocols to be inter-worked with a PSAP controller such that an emergency call placed through a packet-based service provider over a packet-based network can be handled by a PSAP controller. Moreover, location and other data (collectively referred to herein as auxiliary data) that can be transmitted over the packet-based network along with the telephone signaling information and the voice data can be provided to the PSAP more efficiently than if the auxiliary data were obtained from the usual database 108 (FIG. 1). Thus, both voice and location information, in the protocol of the packet-based service provider, are provided to the PSAP according to the protocols that the PSAP is configured to accept.

In the same context of systems for receiving emergency calls, the present invention also provides for inter-working between emergency calls made over the PSTN, digital location information from a database, and packetized data according to a protocol, such as Session Initiation Protocol (SIP), suitable for more modern packet-based PSAP controllers. The present invention further provides for inter-working between calls transmitted over packet-based networks, location information from a database, and packetized data according to a protocol suitable for a packet-based PSAP controller, where the voice and/or location information may be formatted according to protocols other than those that the PSAP is configured to accept.

Although the present invention is illustrated herein with respect to systems for emergency communications, it will be appreciated that the present invention can also be applied to other situations where electronic media operating under disparate protocols need to be inter-worked. For example, cellular telephone calls, text messaging, radio and television broadcasts, and other packet-based communications, can also be inter-worked.

Figure 2:
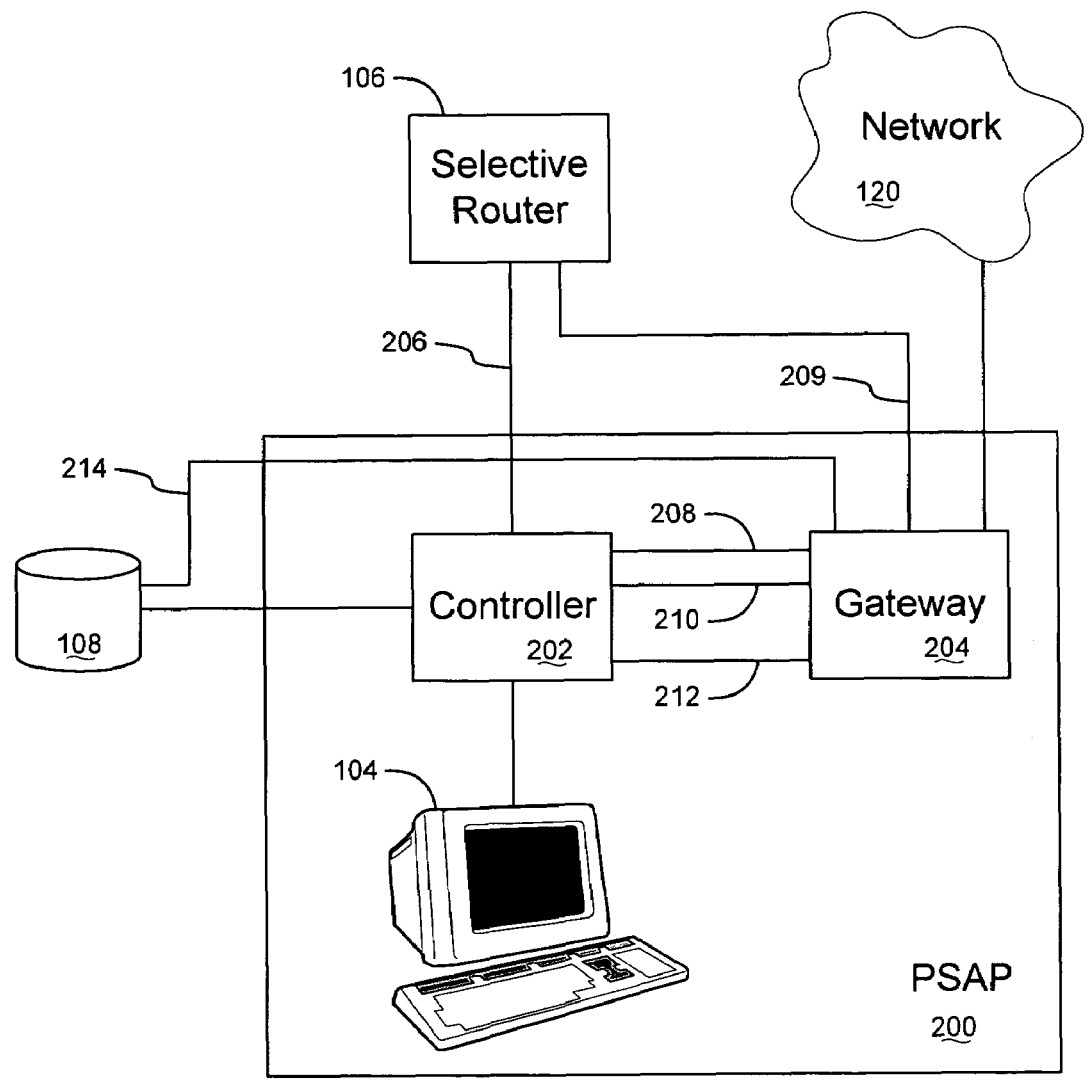
FIG. 2 is a schematic representation of a PSAP according to an embodiment of the invention.

The present invention will first be described with reference to a PSAP configured to include a gateway device that provides desired functionality. FIG. 2 illustrates an exemplary PSAP 200 of the present invention. PSAP 200 includes a controller 202 that, in some embodiments, is a controller 102 (FIG. 1) of the prior art (also referred to herein as a "legacy" controller) while in other embodiments, the controller 202 is a packet-based controller. PSAP 200 also includes a gateway 204 coupled to the controller 202. The functionality of the gateway 204 depends on the type of controller 202 to which it is coupled. Exemplary embodiments where the controller 202 is a legacy controller will be described first, followed by exemplary embodiments where the controller 202 is packet-based.

In those embodiments in which controller 202 is a legacy controller, telephone signaling information from a selective router 106 is received by the controller 202 over a voice trunk 206 according to a protocol such as CAMA or BRI and routed to an available terminal 104 to be answered by a call taker as described above. In these embodiments, the controller 202 is coupled to a database 108, typically by a serial interface, as also described above. In order to accommodate calls made through a packet-based service provider over the packet-based network 120, the gateway 204 communicates with the packet-based network 120 according to protocols of the packet-based network 120 for formatting and routing packets. The gateway 204 transforms telephone signaling information and voice data between packet-based and telephony protocols and sends the telephone signaling information, and later the voice data, to the controller 202 over a voice trunk 208. In this way, an emergency call originally presented to the PSAP 200 according to packet-based protocols is sent to the legacy controller 202 according to telephony protocols over a traditional voice truck 208 as if it had been routed from the selective router 106 (FIG. 1). It will be appreciated that voice data originating at the terminal 104 is also sent over the voice trunk 208 from the controller 202 to the gateway 204 where it is converted between protocols to be sent across the packet-based network 120.

Additionally, many packet-based protocols allow auxiliary data, such as location information, to be associated with the telephone signaling information or the voice data. Location information can be expressed, for example, by a street address, GPS coordinates, and so forth. In these embodiments, the gateway 204 parses the auxiliary data from either the telephone signaling information or the voice data and transforms the auxiliary data into a protocol such as that used by the database 108. The auxiliary data can be buffered by the gateway 204 or immediately sent across a line 210 to the controller 202. In this way, the gateway 204 can mimic the functionality of the database 108 by providing the auxiliary data according to the expected protocol, however without much of the delay associated with searching the database 108 for records.

In those embodiments in which the controller 202 is packet-based, and therefore operates under protocols disparate from the telephony protocols used by the selective router 106, calls from the selective router 106 are instead received by the gateway 204, again over a voice trunk 209. The telephone signaling information and voice data are transformed by the gateway 204 into packet-based protocols recognizable by the controller 202 and sent to the controller 202 over a line 212.

In some of these embodiments, the gateway 204 is connected to the database 108 by a line 214. Here, location information is obtained from the database 108 by the controller 202 through the gateway 204 because of the disparate protocols between the database 108 and the controller 202. Accordingly, the gateway 204 queries the database 108 as if it were a legacy controller 102 (FIG. 1) and transforms the location information received from the database 108 into a packet-based protocol recognized by the controller 202. In some instances, the packet-based protocol permits the location information to be sent over the same channel as the voice data. In this way, the packets received by the packet-based controller 202 from the gateway 204 are formatted according to a protocol such that they appear to be from a packet-based service provider even though the voice data and location information originated from separate sources according to disparate protocols. It will be appreciated that voice data originating at the terminal 104 is likewise routed through the controller 202 and over line 212 to the gateway 204 where it is transformed into a telephony protocol for transmission back to the selective router 106. Thus, a modern packet-based controller 202 for use in conjunction with a packet-based network 120 can also be inter-worked with standard telephony equipment.

In still other embodiments, the gateway 204 can enable emergency calls between a packet-based controller 202 and a packet-based network 120. In these embodiments, the gateway 204 receives telephone signaling information, voice data, and potentially auxiliary data according to a first set of packet-based protocols and transmits these data to the controller 202 according to a second set of packet-based protocols that may be either completely the same, partially the same, or completely different than the first set of packet-based protocols. Where any of the protocols of the network 120 and the controller 202 are different, the gateway 204 converts the data between the different protocols.

Figure 3:
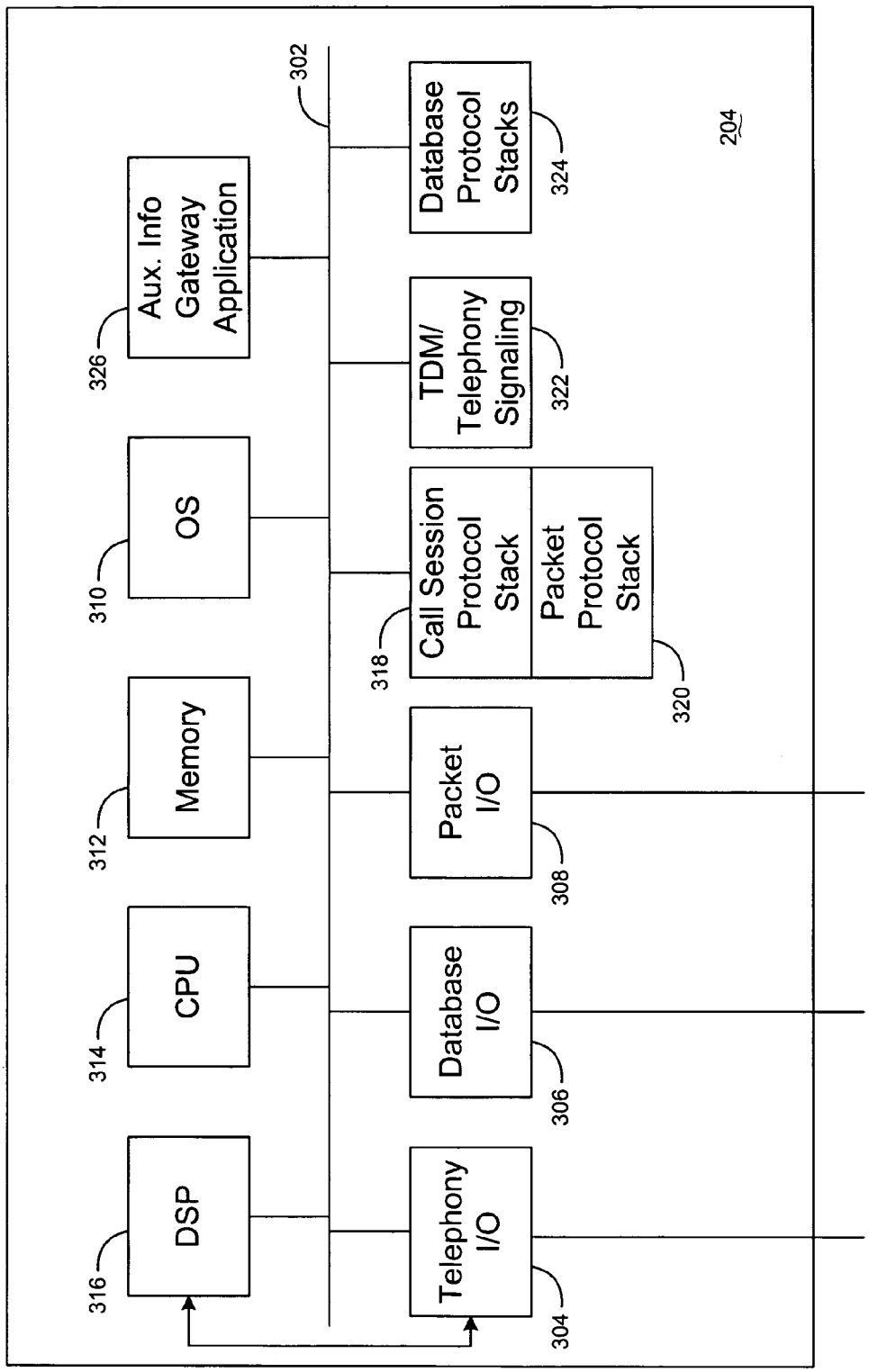
FIG. 3 is a schematic representation of exemplary subsystem components of a gateway according to an embodiment of the invention.

Turning to FIG. 3, a schematic representation is provided of some exemplary subsystem components of an embodiment of the gateway 204. It will be appreciated that in some embodiments individual subsystem components may be omitted where their functions are included in other subsystem components. Likewise, some subsystem components may be omitted where the functionality is not required for the particular embodiment. Further, numerous physical implementations are possible, including placing all of the subsystem components on a single computer chip, distributing the subsystem components across one or more system boards, implementing subsystem components in separate chasses connected by communication networks, etc. Moreover, although the gateway 204 is shown as a separate unit from the controller 202 in FIG. 2, it will be appreciated that all of the functionality of the gateway 204 can be readily integrated into the controller 202.

In FIG. 3, the gateway 204 comprises a bus 302 for providing communication between the various components of the gateway 204. Three I/O interfaces 304, 306, and 308 provide connectivity for analog or digital voice data, database data, and packet data, respectively. An operating system (OS) 310 controls functions of the terminal 104 (FIG. 1) including scheduling tasks, allocating storage, and so forth. A memory 312 can comprise a mass storage device such as a disk drive, a random access memory device, or combinations of both of these. The memory 312 allows instructions to be stored and data to be buffered. A central processing unit (CPU) 314 can be, for example, a microprocessor chip. The central processing unit 314 provides data processing to components of the gateway 204 such as the OS 310. A digital signal processor (DSP) 316 typically manages aspects of the conversion of analog voice data to digital data including de-jitter buffers, codec functions, echo cancellation, and transport frame (such as real-time transport protocol (RTP)) assembly/de-assembly. In some embodiments, the functionality of the DSP 316 is provided instead by the CPU 314.

Call session and packet protocol stacks 318 and 320 provide the means for interpreting the data structures and messaging protocols associated with packet-based call sessions. Telephony signaling module 322 provides necessary logic for interpreting and generating telephony signaling protocols, tones, and so forth. Database protocol stacks 324 provides necessary logic for interpreting and responding as a database to remote queries, and for making queries and interpreting responses from a remote database. Accordingly, database protocol stacks 324 can act as either a client-side or a server-side of a database transaction protocol.

Auxiliary information gateway application 326 integrates the other components of the gateway 204 in a logical framework that enables inter-working between the different communication systems coupled to the gateway 204. Accordingly, the auxiliary information gateway application 326 directs data from one interface to another through appropriate protocol conversions, either merging data from disparate protocols, splitting data in one protocol into several different protocols, or simply converting data between two protocols. Additionally, the auxiliary information gateway application 326 can assign a call session identifier to each call session and keep a log of call sessions. It will be appreciated that the functionality of the auxiliary information gateway application 326 can be readily integrated into other subsystem components, such as the call session protocol stack 318.

The three I/O interfaces 304, 306, and 308 provide connectivity for analog or digital voice data, database data, and packet data, respectively. The I/O interface 304 connects to a voice trunk to enable analog or digital voice data to be sent and received. The telephony I/O interface 304 can support, for example, an analog loopstart circuit employing a "tip" and "ring" wire such as is used in residences or commonly called "1 MB circuits" in business environments, a centralized automated message accounting (CAMA) circuit such as is used by 911 emergency call centers in the United States, E&M trunks such as are used for inter-PBX connectivity, T-1/E-1 channel associated signaling (CAS) circuits that provide digital versions of the above interfaces, Integrated Services Digital Network (ISDN) interfaces such as Basic Rate Interface (BRI) and Primary Rate Interface (PRI), and so forth. The database I/O interface 306 connects to a data line for sending and receiving data such as requests to, and records from, a database 108 (FIG. 1; e.g., an ALI database). The database I/O interface 306 can be, for instance, a serial port or a modem connection for serial communication to a remote database. The packet I/O interface 308 is a packet call session interface for connecting to a packet-based network such as network 120 (FIG. 2). The packet I/O interface 308 can be configured to support, for example, SIP or H.323. It will be understood that although the gateway 204 is shown as having one of each of the I/O interfaces 304, 306, and 308, the gateway 204 may include more than one of any of these interfaces. Additionally, I/O devices that are appropriate for other types of communications protocols may also be integrated into the gateway 204. These can include SS#7 signaling links from traditional service provider telephony networks, serial console connections for local administration, time synchronization interfaces, serial or other interfaces for synchronization with computer-aided dispatch applications, alarm or monitor interfaces for providing audio, visual, and other notification methods in the event of system faults, and so forth. Such embodiments include modules analogous to the protocol stacks 318 and 320 and the TDM/Telephony signaling module 322 to provide necessary logic for handling the data structures and messaging protocols associated therewith.

The operation of the PSAP 200 will be described, by way of several examples, with reference to FIGS. 2 and 3. Examples will be given where the controller is a prior art controller 102 (FIG. 1) and the call originates over a network 102 and is received by the gateway 204 either with or without location information. Examples will then be given where the controller is a packet-based controller 202.

Figure 4:
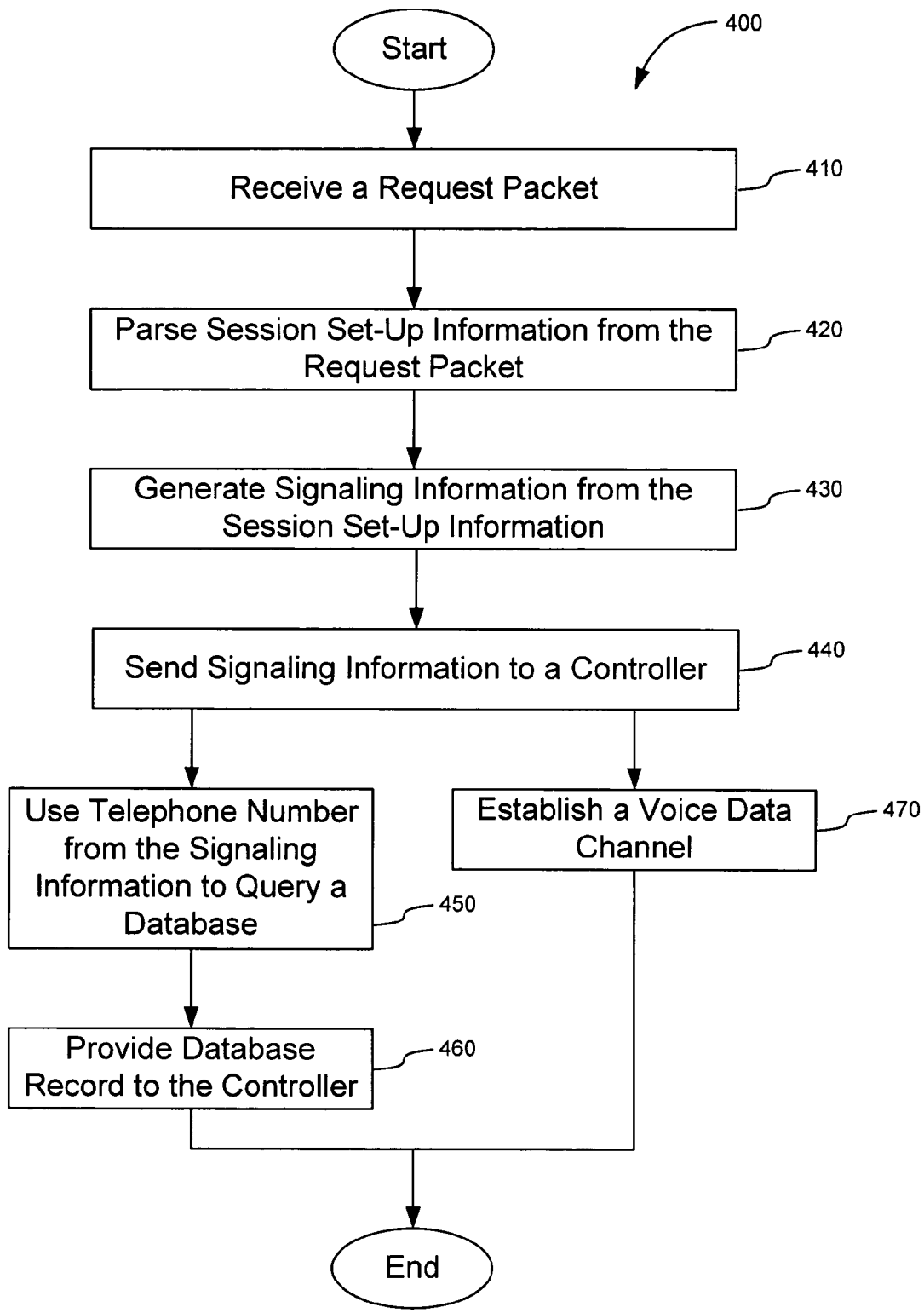
FIG. 4 is a flowchart representing an exemplary embodiment of the method of the invention.

A first example is represented by a flowchart in FIG. 4. With reference to FIGS. 2, 3, and 4, an emergency call that does not include location information is initiated by a calling party over the network 120 and sent through the gateway 204 to the controller 202 that is a legacy controller such as controller 102 (FIG. 1). The controller 202 signals the terminal 104 and queries the database 108. When the terminal 104 accepts the call, a channel for voice data is established through the controller 202 and through the gateway 204. Furthermore, and the controller 202 provides a record from the database 108 to the terminal 104.

More specifically, in a step 410 a request packet is received by the gateway 204 from the network 120 through packet I/O interface 308. The request packet comprises call session set-up information including a phone number of the calling party. The request packet may be organized according to any number of available protocols. For example, a Session Initiation Protocol (SIP) Invite packet can include the call session set-up information in a header of the packet. A request packet can also be a H.225 Setup packet per the H.323 protocol. Those of ordinary skill will be able to make use of standards documents for specific protocols to implement the present invention. Examples of relevant standards documents for SIP can be found at http://www.ietf.org/html.charters/sip-charter.html and relevant standards documents for H.323 can be found at http://www.itu.int/rec/recommendation.asp?type=folders&lang=e&parent=T-REC-H.323.

In this first example, the auxiliary information gateway application 326 uses the protocol stacks 318, 320 to parse the call session set-up information from the request packet, shown as step 420 in FIG. 4. In a step 430, the auxiliary information gateway application 326 uses the TDM/Telephony signaling module 322 to generate telephone signaling information from the call session set-up information. The telephone signaling information is generated in a protocol, such as CAMA or BRI, which is appropriate for the controller 202. The telephone signaling information in step 440 is then sent through the telephony I/O interface 304 to the controller 202 which signals the terminal 104. In step 450, the controller 202 uses the phone number included in the signaling information to query the database 108. In step 460, the database returns those records associated with the phone number to the controller 204, which passes the records to the terminal 104. Examples of relevant standards documents for ALI data transmission can be found at http://www.nena.org/9-1-1TechStandards/nena_recommended_standards.htm.

Once the call is answered at the terminal 104, a voice data channel is established in step 470 between the terminal 104 and the calling party through the controller 202 and the gateway 204. Voice data from the calling party is transmitted over the network 120 in packets according to a protocol, such as SIP or H.323, and received by the gateway 204 through the packet I/O interface 308. The auxiliary information gateway application 326 uses the protocol stacks 318, 320 to assemble the voice data packets, and uses the TDM/Telephony signaling module 322 to produce voice data in an analog signal appropriate for the controller 202. The analog signal is sent out of the gateway 204 through the telephony I/O interface 304 to the controller 202 and to the terminal 104. Similarly, voice data from the terminal 104 is received at the gateway 204 through the telephony I/O interface 304. The auxiliary information gateway application 326 uses the TDM/Telephony signaling module 322 and the protocol stacks 318, 320 to assemble the voice data into packets that are transmitted back to the calling party through the packet I/O interface 308.

Figure 5:
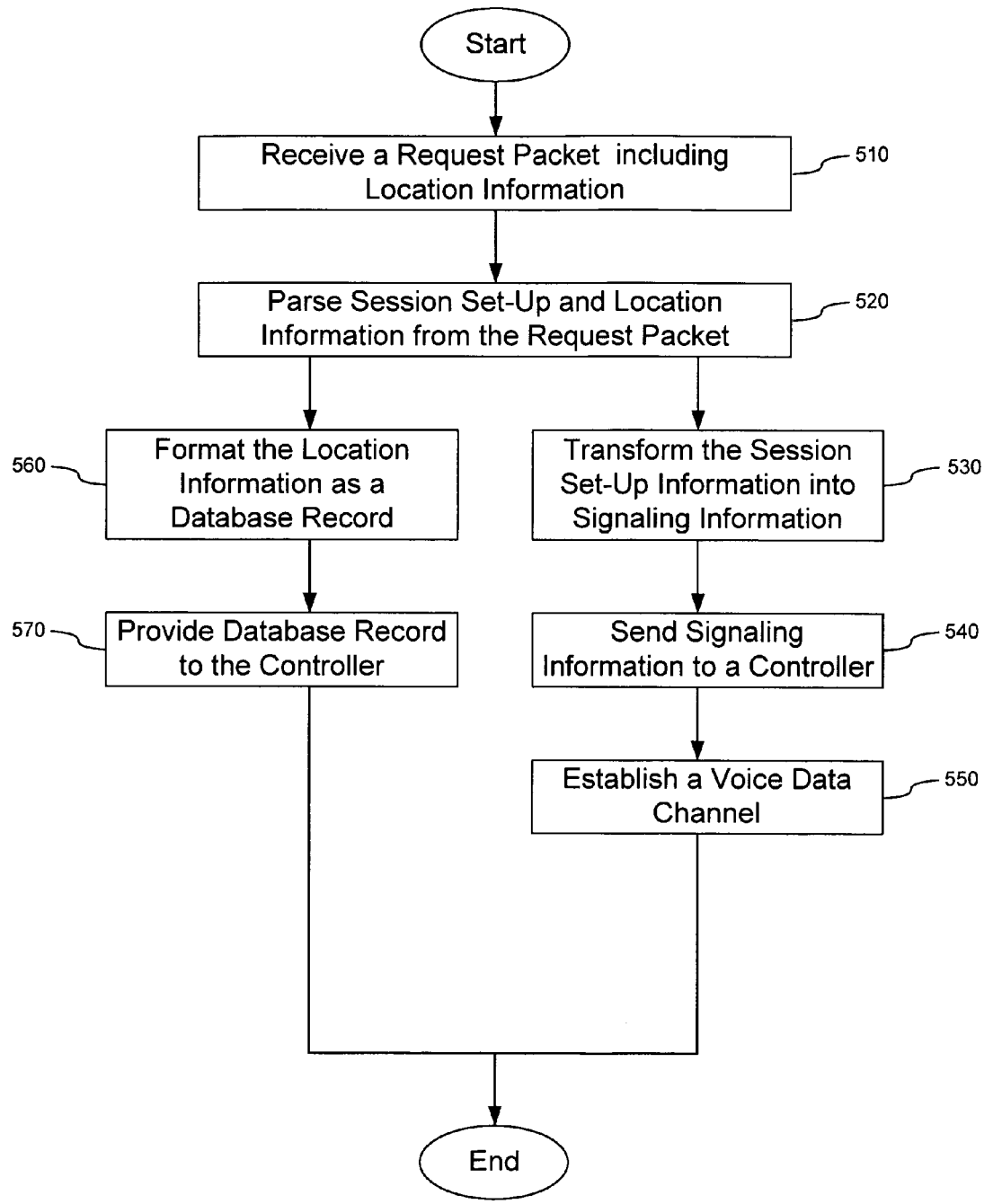
FIG. 5 is a flowchart representing another exemplary embodiment of the method of the invention.

A second example is illustrated by the flowchart in FIG. 5. With reference to FIGS. 2, 3, and 5, an emergency call that includes location information is initiated by a calling party over the network 120. A request packet that can comprise the location information is sent through the gateway 204 to the legacy controller 202. The controller 202 parses the call session set-up information and location information from the request packet and signals the terminal 104. When the terminal 104 accepts the call, a channel for voice data is established as in the example above. The location information can be either supplied immediately to the controller 202, or it can be stored until the controller 202 makes a request for it. Updated location information can also be sent to the controller 202 and to the terminal 104 during the call.

More specifically, in a step 510, a request packet is received by gateway 204 from the network 120 through the packet I/O interface 308. In this example, the request packet comprises both call session set-up and location information. For example, a SIP Invite packet can include the call session set-up in the header of the packet and location information in a body of the packet. The auxiliary information gateway application 326 uses the protocol stacks 318, 320 in a step 520 to parse the call session set-up and the location information from the request packet. In a step 530, the call session set-up information is converted into telephone signaling information. Next, in a step 540 the telephone signaling information is sent to the controller 220. Subsequently, in a step 550, a voice data channel is established. Steps 530, 540, and 550 are performed in the same manner as in the embodiment of FIG. 4.

Rather than have the controller 202 obtain location information by retrieving a record from the database 108, in this example, the location information is already at the gateway 204. In step 560, the auxiliary information gateway application 326 uses the database protocol stacks 324 to format the location information as a record according to a protocol used by the database 108.

In a step 570, the record is provided to the controller 202 by the gateway 204. In some instances the location information is sent directly to the controller 202 through the database I/O interface 306, while in other instances, providing the record to the controller 202 includes storing the record in a buffer such as memory 312 for later delivery. In those instances in which the record is stored, the gateway 204 merely mimics the functionality of the database 108. Accordingly, instead of querying the database 108 for the record, the controller 202 requests the record from the gateway 204 by sending the telephone number over the database I/O interface 306. The auxiliary information gateway application 326 recognizes the phone number as a request for a location record and returns the stored record associated with the phone number over the database I/O interface 306 to the controller 202. It will be understood that in order to properly request the record from the gateway 204 rather than from the database 108, the controller 202 needs to be configured to make location record requests over line 210 when a voice data channel is established over the particular voice trunk 208 that is connected to the gateway 204.

The operation of the PSAP 200 will be further described by way of several examples in which the controller is a packet-based controller 202. In these examples, the gateway 204 allows the controller 202 to either communicate with a selective router 106 or a network 120. Thus, the controller 202 within the PSAP 200 can be modernized to take advantage of IP protocols while still being able to communicate with the existing infrastructure.

Figure 6:
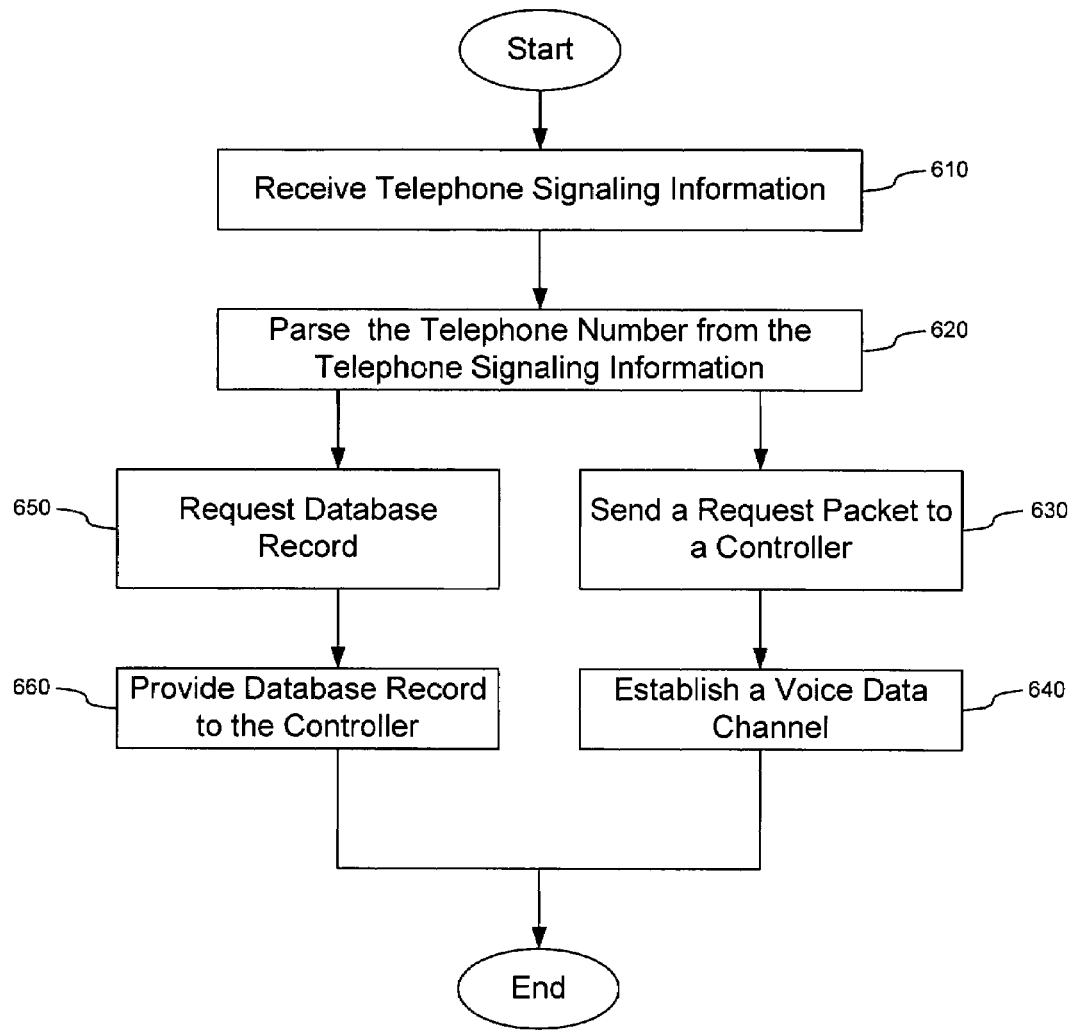
FIG. 6 is a flowchart representing another exemplary embodiment of the method of the invention.

In a third example, and with reference to FIGS. 2, 3, and 6, an emergency call is initiated by a calling party and directed to the PSAP 200 by the selective router 106. Here, in a step 610, telephone signaling information is transmitted through telephony I/O interface 304. In a step 620, the auxiliary information gateway application 326 uses the TDM/Telephony signaling module 322 and the protocol stacks 318, 320 to parse the telephone number of the calling party from the telephone signaling information. The telephone number can be stored by the gateway 204, and in some embodiments the phone number is stored in conjunction with a call session identifier. In a step 630, a request packet including call session set-up information such as the phone number is generated and sent over the packet I/O interface 308 to the controller 202 which signals the terminal 104. Once the terminal 104 accepts the call, a channel for voice data is established through the controller 202 and the gateway 204 in a step 640. The gateway 204 maintains the channel for voice data by performing the same conversions between analog telephony and packetized voice data described above with respect to the first example of FIG. 4.

In the present example, location information is obtained by the gateway 204 from the database 108 and passed to the controller 202. In a step 650, the auxiliary information gateway application 326 uses the phone number of the calling party, parsed from the telephone signaling information, to request records associated with the telephone number from the database 108. The auxiliary information gateway application 326 uses the data protocol stacks 324 and the protocol stacks 318, 320 in a step 660 to packetize the returned records and sends the records to the controller 202.

In some instances, the database 108 may be updated during the call session. For example, wireless phone networks can determine the location of a phone through triangulation between multiple cell phone towers. The location information can be transmitted to the database 108 through an independent channel so that the database 108 is periodically updated. To take advantage of periodically updated information in the database 108, however, the controller 202 needs to be configured to periodically query the gateway 204, or be provided with some other means to alert the controller 202 that updated location information has become available.

Figure 7:
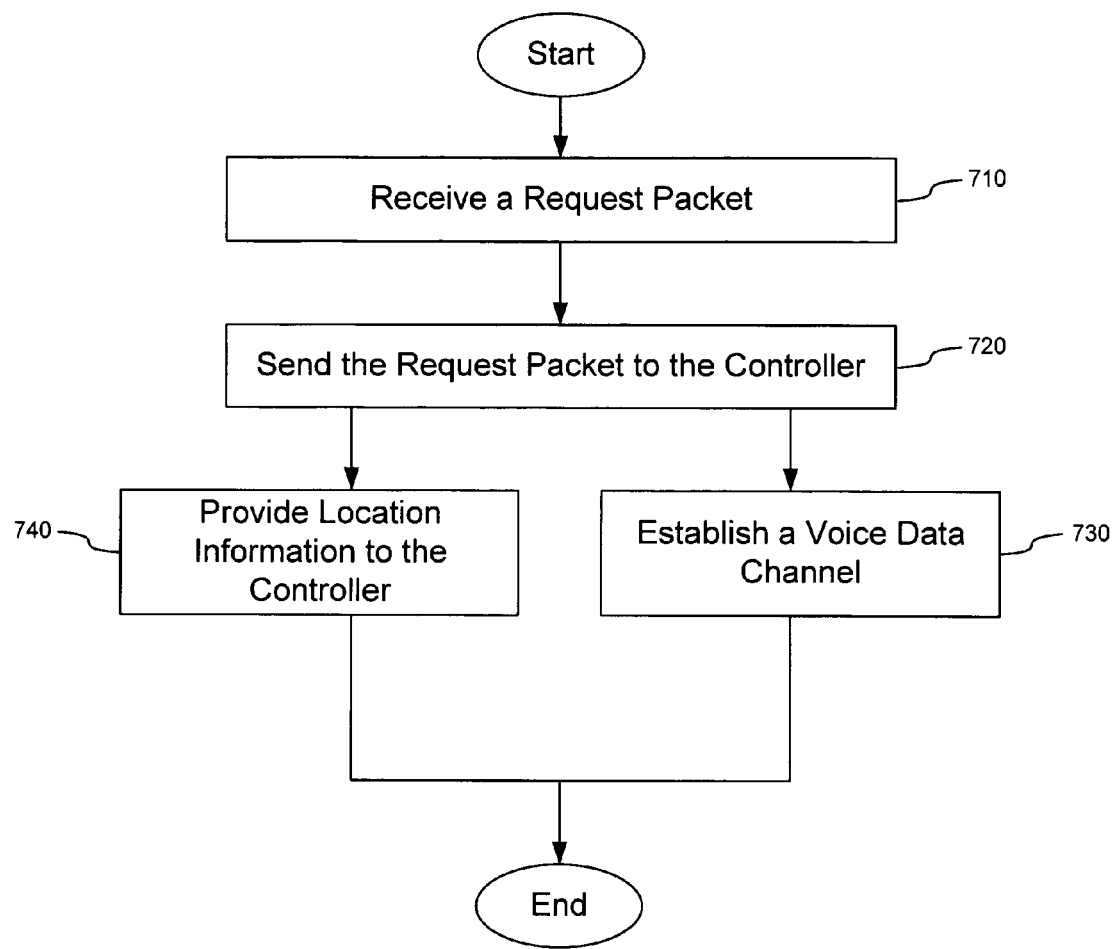
FIG. 7 is a flowchart representing another exemplary embodiment of the method of the invention.

In a fourth example, and with reference to FIGS. 2, 3, and 7, in a step 710, an emergency call is initiated by a calling party and a request packet is directed to the PSAP 200 across the network 120 and through packet I/O interface 308. The auxiliary information gateway application 326, in a step 720, uses the protocol stacks 318, 320 to direct the request packet back through the packet I/O interface 308 to the controller 202 which signals the terminal 104. When the terminal 104 accepts the call, in a step 730, a voice data channel is established through the controller 202 and the gateway 204. In this instance, although the call session set-up information and voice data are both received and sent by the gateway 204 in packets, the gateway 204 may still have to perform protocol translations. For example, the controller 202 may operate according to the SIP protocol while the network 120 operates according to the H.323 protocol, thus the auxiliary information gateway application 326 uses the protocol stacks 318, 320 to convert packets between the two protocols.

In a step 740, location information is provided to the controller 202. In this example, as in the third example of FIG. 6 above, location information can be obtained by the gateway 204 from the database 108 and passed to the controller 202. Alternatively, location information can be obtained from the request packet, if available. In the first alternative, the auxiliary information gateway application 326 uses the phone number of the calling party, parsed from the request packet, to request records associated with the telephone number from the database 108. The auxiliary information gateway application 326 then uses the data protocol stacks 324 and the protocol stacks 318, 320 to packetize the returned records and sends the records to the controller 202. As noted, location information can also be obtained from the request packet, if available. In these instances, the gateway 204 can provide location information from the request packet to the controller 202 as in the second example of FIG. 5, described above.

It will be further appreciated that location information can also be transmitted in update packets as needed to reflect changes in location. Update packets received by the gateway 204 can be directed to the controller 202, with a protocol conversion, if necessary, so that newer location information can be made available at the terminal 104. It should be noted that in the second example, above, in which location information is provided in the request packet but the controller 202 happens to be a legacy controller, in some instances, updated location information received in an update packet can also be provided to the controller 202. In this case, however, the controller 202 would need to be configured to periodically query the gateway 204, or be provided with some other means to alert the controller 202 that updated location information is available.

Moreover, it will be understood that location information is but one example of the auxiliary data that can be provided over the network 120 to the gateway 204. Auxiliary data can also comprise image, video, text, and so forth. Auxiliary data can be received either on the same channel as voice data ("in-band") or over a separate channel ("out-of-band"). Accordingly, where the controller 202 operates according to a packet-based protocol, the gateway 204 can pass the auxiliary data to the controller 202 which may then communicate the auxiliary data to the terminal 104. In order to handle auxiliary data, including converting the auxiliary data between protocols, the gateway 204 can comprise, as necessary, additional I/O devices and modules analogous to the protocol stacks 318 and 320 and the TDM/Telephony signaling module 322.

It will also be understood that the present invention is not limited to emergency call systems and can also be readily applied to other Computer-Telephony-Interface (CTI) applications, such as customer relationship management (CRM) applications, that perform database queries using calling party phone numbers, for instance, as database keys. More generally still, the present invention is readily applicable where communications systems that operate under disparate protocols need to be integrated. Typically, where two media types with different protocols are brought together each will comprise a correlating identifier that the gateway 204 can use to associate the data from the two endpoints. In the examples provided above, the usual correlating identifier is a phone number, thus the gateway 204 knows to associate the record returned from the database 108 with the voice data for the same phone number. Although the correlating identifier will commonly be the same for each communication medium being brought together, this is not a requirement. Accordingly, each communication medium can have a unique correlating identifier so long as the gateway 204 has some means, such as a look-up table, by which to associate the different correlating identifiers.

In the foregoing specification, the present invention is described with reference to specific embodiments thereof, but those skilled in the art will recognize that the present invention is not limited thereto. Various features and aspects of the above-described invention may be used individually or jointly. Further, the present invention can be utilized in any number of environments and applications beyond those described herein without departing from the broader spirit and scope of the specification. The specification and drawings are, accordingly, to be regarded as illustrative rather than restrictive.

What is claimed is:

1. A gateway device for a Public Safety Answering Point comprising:
    a packet I/O interface configured for communicating with a packet-based network;
    a telephony I/O interface configured for communicating with a controller;

a database I/O interface configured for communicating with a location database;

packet protocol stacks configured for handling data packets;

a TDM/Telephony signaling module configured for generating telephone signaling information and handling analog voice data;

database protocol stacks for handling location database records; and an auxiliary information gateway application configured to use the packet protocol stacks and the TDM/Telephony signaling module to parse call session set-up information from a request packet and generate telephone signaling information therefrom, convert analog voice data to packetized voice data and direct the packetized voice data to the packet I/O interface, and convert packetized voice data to analog voice data and direct the analog voice data to the telephony I/O interface.

2. The gateway of claim 1 wherein the auxiliary information gateway application is further configured to parse a telephone number from the call session set-up information and send the telephone number to the database I/O interface.

3. The gateway of claim 1 wherein the auxiliary information gateway application is further configured to receive a location database record from the database I/O interface and use the packet protocol stacks and the database protocol stacks to packetize the location database record and direct the packetized location database record to the packet I/O interface.

4. The gateway of claim 1 wherein the auxiliary information gateway application is further configured to use the packet protocol stacks and database protocol stacks to parse location information from the request packet and provide the location information as a location database record to a database I/O interface.

5. The gateway of claim 1 wherein the auxiliary information gateway application is further configured to use the packet protocol stacks to convert packetized data between packet-based protocols.

6. A controller for a Public Safety Answering Point comprising:

a packet I/O interface configured for communicating with a packet-based network;

a telephony I/O interface configured for communicating with a PSTN;

a database I/O interface configured for communicating with a location database;

packet protocol stacks configured for handling data packets;

a TDM/Telephony signaling module configured for generating telephone signaling information and handling analog voice data;

database protocol stacks for handling location database records; and an auxiliary information gateway application configured to use the packet protocol stacks and the TDM/Telephony signaling module to parse call session set-up information from a request packet and generate telephone signaling information therefrom, convert analog voice data to packetized voice data and direct the packetized voice data to the packet I/O interface, and convert packetized voice data to analog voice data and direct the analog voice data to the telephony I/O interface.

7. A method for enabling an emergency call comprising:

receiving a request packet from a calling party;

parsing call session set-up information from the request packet;

generating telephone signaling information, including a telephone number of the calling party, from the call session set-up information;

sending the telephone signaling information to a controller;

establishing a voice data channel through the controller;

querying a location database using the telephone number; and providing a location database record to the controller.

8. The method of claim 7 wherein providing the location database record to the controller comprises converting the location database record from a packet-based data transmission protocol to a serial data transmission protocol.

9. The method of claim 7 further comprising parsing auxiliary information from the request packet.

10. The method of claim 9 further comprising buffering the auxiliary information.

11. The method of claim 9 wherein the auxiliary information comprises location information, querying the location database is omitted from the method, and providing the location database record to the controller includes formatting the location information as the database record.

12. The method of claim 9 further comprising sending the auxiliary information to the controller.

13. The method of claim 12 wherein sending the auxiliary information to the controller comprises converting the auxiliary information from a packet-based protocol into another protocol.

14. A method for enabling an emergency call comprising:

receiving telephone signaling information from a calling party;

parsing a telephone number from the telephone signaling information;

generating a request packet comprising call session set-up information including the telephone number;

sending the request packet to a controller;

establishing a voice data channel through the controller;

querying a location database using the telephone number; and providing a location database record to the controller.

15. The method of claim 14 wherein providing the location database record to the controller comprises packetizing the location database record.

16. The method of claim 14 wherein querying the location database comprises periodically querying the location database for an updated record.

* * * * *